United States Patent
Waissi (10) Patent No.: US 10,808,628 B2
(45) Date of Patent: Oct. 20, 2020

(54) HYDROMECHANICAL CUTOFF DEVICE WITH HYSTERESIS FOR A TURBOMACHINE LUBRIFICATION SYSTEM

(71) Applicant: Safran Aircraft Engines, Paris (FR)

(72) Inventor: Bellal Waissi, Vert Saint Denis (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 450 days.

(21) Appl. No.: 15/827,532

(22) Filed: Nov. 30, 2017

(65) Prior Publication Data

US 2018/0156139 A1 Jun. 7, 2018

(30) Foreign Application Priority Data

Dec. 2, 2016 (FR) .................................... 16 61836

(51) Int. Cl.
| | |
|---|---|
| *F02C 9/46* | (2006.01) |
| *F02C 7/06* | (2006.01) |
| *F01D 25/20* | (2006.01) |
| *F02C 7/232* | (2006.01) |

(52) U.S. Cl.
CPC ............... *F02C 9/46* (2013.01); *F01D 25/20* (2013.01); *F02C 7/06* (2013.01); *F02C 7/232* (2013.01); *F05D 2240/35* (2013.01); *F05D 2270/09* (2013.01); *F05D 2270/301* (2013.01); *F05D 2270/304* (2013.01); *Y02T 50/671* (2013.01)

(58) Field of Classification Search
CPC .... F02C 9/46; F02C 7/06; F01D 25/20; F01D 25/18; F05D 2260/98; F05D 2270/3015; F05D 2270/304
See application file for complete search history.

(56) References Cited

U.S. PATENT DOCUMENTS

| | | | | |
|---|---|---|---|---|
| 4,245,465 A | * | 1/1981 | Milo | ....................... F16N 27/00 |
| | | | | 184/6.11 |
| 5,067,454 A | | 11/1991 | Waddington et al. | |
| 2008/0264726 A1 | * | 10/2008 | Cornet | .................... F01D 25/20 |
| | | | | 184/6.11 |
| 2009/0194044 A1 | | 8/2009 | Nishida | |
| 2017/0044986 A1 | | 2/2017 | Vertenoeuil et al. | |
| 2017/0101935 A1 | | 4/2017 | Waissi et al. | |

FOREIGN PATENT DOCUMENTS

| | | |
|---|---|---|
| WO | 2012052658 A2 | 4/2012 |
| WO | 20150155465 A1 | 10/2015 |

OTHER PUBLICATIONS

Search Report issued in French Patent Application No. 1661836 dated Jul. 17, 2017.
Application document as-filed for patent application entitled: Butterfly Valve for Bleeding a Compressor for an Aircraft Turbine Engine, U.S. Appl. No. 15/572,953, filed Nov. 9, 2017.

* cited by examiner

*Primary Examiner* — Andrew H Nguyen (74) *Attorney, Agent, or Firm* — Pearne & Gordon LLP (57) ABSTRACT

The invention relates to a lubrication system for turbomachine. The hydromechanical cutoff device is configured to close when a rotation speed of a turbomachine shaft reduces and becomes lower than a first threshold, and wherein the hydromechanical cutoff device is configured to open when the rotation speed of the shaft increases and becomes higher than a second threshold higher than the first threshold.

16 Claims, 5 Drawing Sheets

HYDROMECHANICAL CUTOFF DEVICE WITH HYSTERESIS FOR A TURBOMACHINE LUBRIFICATION SYSTEM

TECHNICAL DOMAIN

The invention relates to fluid supply systems for turbomachines. More precisely, the invention relates to isolation of a combustible fluid tank, particularly during a fire in a turbomachine.

STATE OF PRIOR ART

Turbomachine lubrication systems are configured in a known manner to allow a sufficient oil flow to cool the turbomachine in case of fire. This oil flow circulates under the effect of a lubricant feed pump driven by natural self-rotation of the turbomachine when the aircraft is in flight.

However, when this oil flow is insufficient to cool the turbomachine during a fire, the oil flow to turbomachine ancillaries often has to be limited and/or special protection has to be provided for this equipment to protect against fires. Special protection against fires has the disadvantage that it can increase the mass and overall dimensions.

It is known that the oil tank can be isolated from the remainder of the lubrication system by a cutoff valve that may be passive or controlled by a digital control system until the fire is definitively extinguished, to limit the flow of combustible fluid circulating in a lubrication system in case of a fire in a turbomachine.

Nevertheless, the use of a passive control valve may be complex to implement because it often results in the lack of lubrication of the turbomachine when the turbomachine is stopped. However, the digital control system of some turbomachines or some aircraft might not be available during a fire to control opening or closing of a controlled cutoff valve.

Furthermore, the regulations in force require that the turbomachine should be capable of resisting a fire for a minimal duration, while assuring that no combustible material is supplied to the fire during this period.

Therefore there is a need to isolate a combustible fluid tank from the turbomachine in case of fire, while limiting availability requirements for a digital control system, and the mass and dimensions of the turbomachine.

PRESENTATION OF THE INVENTION

The invention is intended to at least partially solve problems encountered in solutions according to prior art.

In this respect, the purpose of the invention is a turbomachine lubrication system.

The lubrication system comprises a fluid tank and a downstream part comprising a pump to circulate lubricant, the downstream part being located downstream from the tank. The lubrication system comprises a hydromechanical cutoff device located between the tank and the downstream part, the cutoff device being configured to limit/prevent a lubricant flow towards the downstream part when it is closed.

The cutoff device is configured to be closed when the rotation speed of the turbomachine shaft is lower than a first threshold. The cutoff device is configured to be open when the shaft rotation speed is higher than a second threshold higher than the first threshold.

According to the invention, the cutoff device is configured to close when the shaft rotation speed reduces and becomes lower than the first threshold, and the cutoff device is configured to open when the shaft rotation speed increases and becomes higher than the second threshold. The cutoff device includes a fluid connection to an inlet of a fuel pump and to an outlet of the fuel pump, the fuel pump being configured to deliver fuel at increasing pressure depending on the shaft rotation speed, when there is no fire in the turbomachine.

The supply system and the corresponding isolation method can isolate the tank in the case of a fire inside the turbomachine, while limiting the mass and overall dimensions of the turbomachine, and in particular respecting legal requirements for protection against fires inside a turbomachine. By connecting the fuel pump to the cutoff device, the lubricant flow can be adjusted as a function of the turbomachine shaft rotation speed and, if a fire is detected, also limiting loads on the turbomachine digital control system, particularly in case of a fire.

The invention may optionally comprise one or several of the following characteristics, possibly combined with each other.

Advantageously, the cutoff device is configured to be open while the shaft rotation speed reduces from a value higher than the second threshold to a value of the rotation speed higher than the first threshold, when there is no fire in the turbomachine.

Advantageously, the cutoff device is configured to be closed while the shaft rotation speed increases from a value of the rotation speed lower than the first threshold to a value of the rotation speed lower than the second threshold.

According to one particular embodiment, the lubricant supply pump is configured to operate when the shaft rotation speed is higher than the first threshold.

According to one particular embodiment, the second threshold is higher than a maximum self-rotation speed of the turbomachine shaft.

Preferably, the fuel pump is a kinetic pump. The kinetic pump is preferably a centrifugal pump.

Advantageously, the fuel pump is a low pressure fuel pump for a turbomachine fuel supply system, the fuel pump being configured to deliver fuel to a high pressure pump.

Preferably, the fuel pump is a volumetric pump.

Advantageously, the fuel pump is configured to stop when a fire is detected in the turbomachine, the cutoff device being configured to close when the fuel pump is stopped.

The lubrication system thus stops the supply of lubricant when the fuel pump is stopped if a fire is detected.

According to another particular feature, the cutoff device comprises a main valve comprising at least one first chamber with a fluid connection to the fuel pump, and a main control chamber separated from the first chamber by a valve closer. The main control chamber is configured to be connected alternatively to the fuel pump inlet and to the fuel pump outlet.

Advantageously, the main valve comprises:

a high pressure inlet with a fluid connection to the fuel pump outlet, the high pressure inlet opening up into the first chamber of said high pressure chamber of the valve, a low pressure inlet with a fluid connection to the fuel pump inlet, the low pressure inlet opening up into a low pressure chamber of the valve separated from the high pressure chamber by the closer, a high pressure inlet port with a fluid connection to the fuel pump outlet, a low pressure inlet port with a fluid connection to the fuel pump inlet, a first outlet port with a fluid connection alternatively to the high pressure inlet port and to the low pressure inlet port, another outlet port with a fluid connection to the control chamber, and a lubricant inlet and a lubricant outlet.

According to one particular feature, the cutoff device comprises a control valve comprising at least one secondary control chamber with a fluid connection to the main control chamber, the secondary control chamber being alternatively connected to the fuel pump inlet and to the fuel pump outlet.

According to one advantageous embodiment, the control valve also comprises a first chamber with a fluid connection to the fuel pump inlet, and a second chamber with a fluid connection to the first outlet port of the main valve, the second chamber being separated from the first chamber by a closer of the control valve.

The invention also relates to a turbomachine comprising a lubrication system like that defined above. The turbomachine is preferably an aircraft turbomachine such as a turbojet, a turbine engine or a turboprop.

The invention also relates to a method of isolating the lubricant tank from the downstream part, in which the cutoff device is closed when the turbomachine shaft rotation speed is lower than the first threshold, the cutoff device being open when the shaft rotation speed is higher than the second threshold.

According to the invention, the cutoff device closes when the shaft rotation speed reduces and becomes lower than the first threshold, and the cutoff device opens when the shaft rotation speed increases and becomes higher than the second threshold.

More precisely, the cutoff device closes particularly when the pressure difference in the fuel passing through the fuel pump reduces and becomes lower than a first pressure value corresponding to a shaft rotation speed equal to the first threshold, and the cutoff device opens when the pressure difference in the fuel passing through the fuel pump increases and becomes higher than a second pressure value corresponding to a shaft rotation speed equal to the second threshold.

BRIEF DESCRIPTION OF THE DRAWINGS

This invention will be better understood after reading the description of example embodiments given purely for information and that are in no way limitative, with reference to the appended drawings on which.

DETAILED PRESENTATION OF PARTICULAR EMBODIMENTS

Identical, similar or equivalent parts of the different figures have the same numeric references to facilitate comparison of the different figures.

Figure 1:
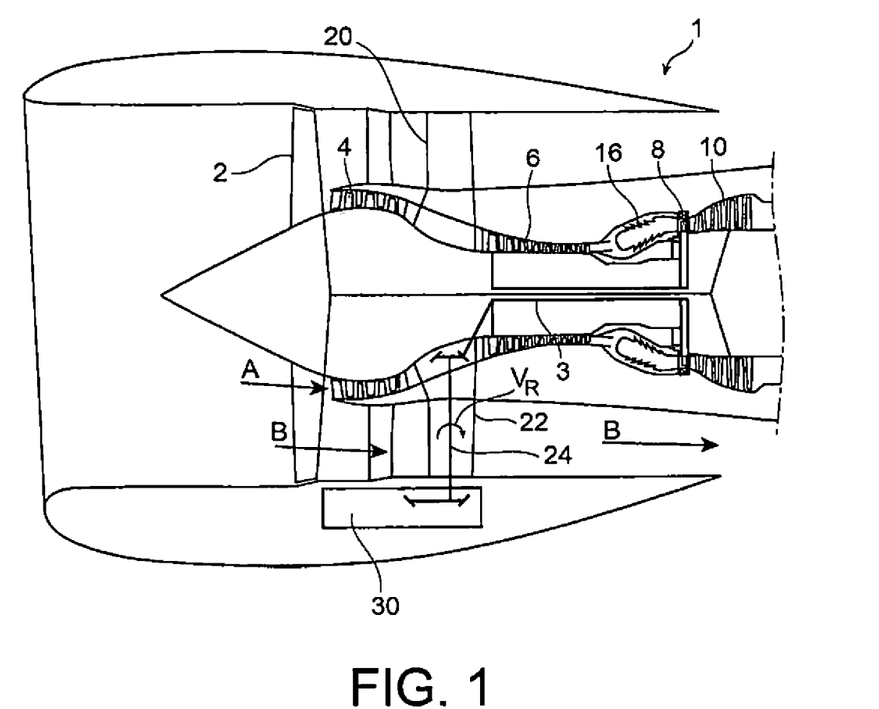
FIG. 1 is a partial diagrammatic longitudinal sectional view of a turbomachine according to a first embodiment of the invention.

FIG. 1 shows a twin-flow twin-spool turbomachine 1. The turbomachine 1 generally comprises a fan 2, a low pressure compressor 4, a high pressure compressor 6, a combustion chamber 16, a high pressure turbine 8 and a low pressure turbine 10, in order along the flow path of a core flow A.

The low pressure compressor 4, the high pressure compressor 6, the high pressure turbine 8 and the low pressure turbine 10 delimit a fan flow stream of a fan flow B that bypasses them.

The high pressure compressor 6 and the high pressure turbine 8 are mechanically connected through a drive shaft 3 of the high pressure compressor 6, so as to form a high pressure case of the turbomachine 1. Similarly, the low pressure compressor 4 and the low pressure turbine 10 are mechanically connected through a shaft of the turbomachine 1, so as to form a low pressure case of the turbomachine 1.

The turbomachine 1 also comprises an intermediate case 20 through which radial structural arms 22 pass. One of the structural arms 22 comprises a radial shaft 24, of which the radially inner end is mechanically connected through gears to the drive shaft 3 of the high pressure compressor 6. The radially outer end of the radial shaft 24 is mechanically connected through gears to a gearbox 30 configured to act as an accessory gearbox for the turbomachine 1. Consequently, the gearbox 30 is configured to be driven in rotation by the high pressure case.

The gearbox 30 is also called the "accessory gearbox". It comprises a plurality of pieces of equipment such as a lubricant supply pump 112, a fuel supply pump, a starter or an electricity generator.

Figure 2:
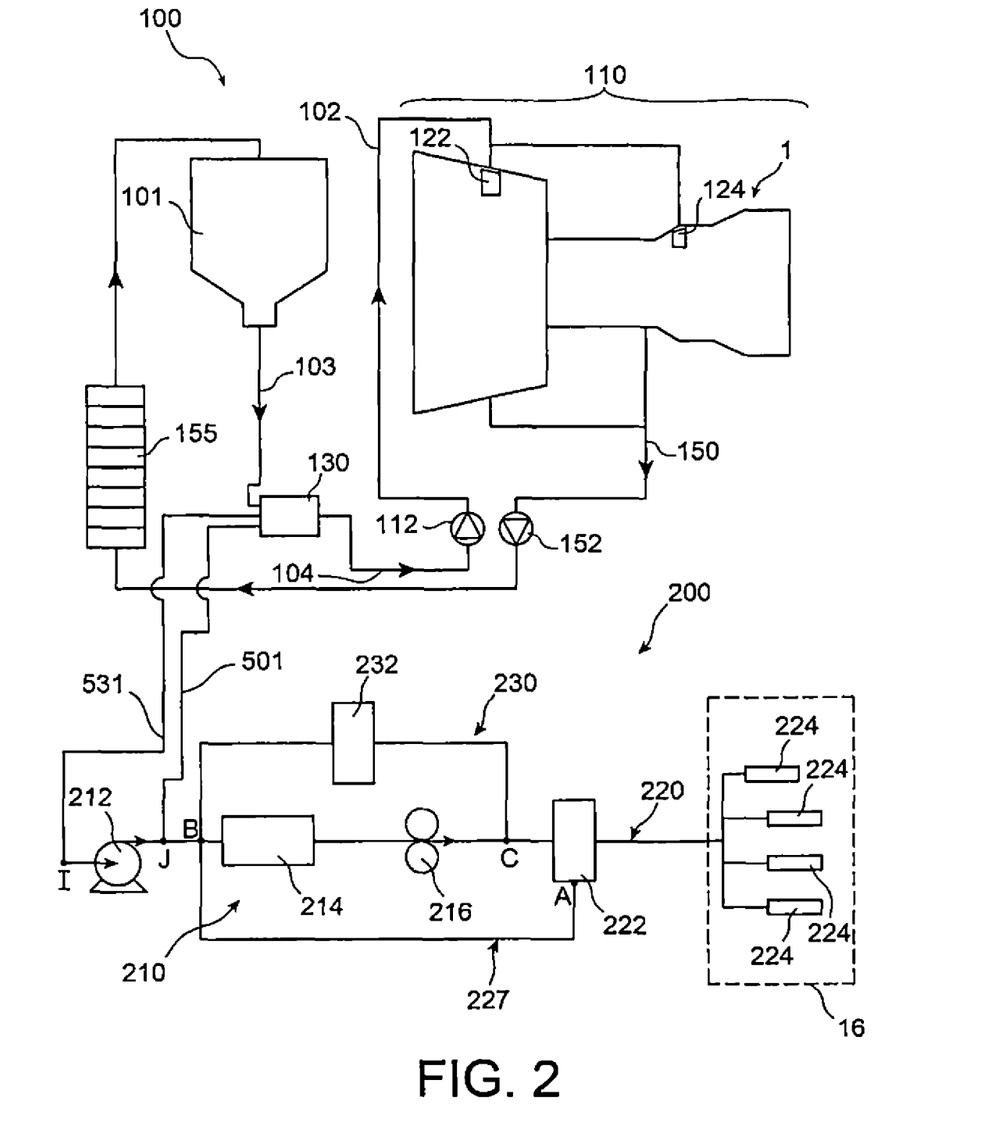
FIG. 2 is a partial diagrammatic view of a fuel supply system and a lubricant supply system, according to the first embodiment of the invention.

With reference to FIG. 2, the turbomachine 1 comprises a lubrication system 100 comprising a supply system 102 and a lubricant return circuit 150 to the lubricant tank 101.

The lubrication system is configured to supply lubricant to at least one lubrication chamber 122, 124 of the turbomachine 1 from a lubricant tank 101. The lubrication chambers 122, 124 classically comprise equipment to be lubricated for nominal operation of the turbomachine 1.

In this document, the "upstream" and "downstream" directions are defined by the general direction of the supply flow of fluid that is lubricant in the first embodiment.

Along the upstream to downstream direction, the supply system 102 comprises the tank 101, a lubricant supply cutoff device 130, and a lubricant supply pump 112.

The cutoff device 130 is configured to stop the lubricant supply from the tank 101 towards the pump 112. There is a conduit 103 forming a fluid connection between the cutoff device and the outlet from the tank 101.

The lubricant supply pump 112 is located between the cutoff device 130 and the lubrication chambers 122, 124. There is a conduit 104 forming a fluid connection connecting the lubricant supply pump to the cutoff device 130.

The lubricant supply pump 112 and the lubrication chambers 122, 124 form a downstream part 110 of the supply system 102.

The lubricant return circuit 150 comprises a lubricant return pump 152 configured to supply lubricant to the tank 101 from the lubrication chamber 122, 124.

The lubricant return circuit 150 comprises a heat exchanger 155 between the lubricant return pump 152 and the tank 101, configured to cool the lubricant, typically oil, before it is returned to the tank 101. The heat exchanger 155 thus limits risks of premature degradation of the lubricant.

The turbomachine 1 also comprises a fuel supply system 200 that comprises an upstream circuit 210, a variable geometries supply circuit 230 and a combustion chamber supply circuit 220.

The upstream circuit comprises a kinetic pump 212 that forms a low pressure pump, a hydraulic resistance 214 that comprises at least one element chosen from among a filter, a cutoff valve or a flow meter, and a high pressure volumetric pump 216.

The kinetic pump 212 is a centrifugal pump. It increases the pressure in the fuel that flows towards the volumetric pump 216. The kinetic pump 212 outputs fuel at a pressure that increases as a function of the rotation speed $V_R$ of the radial shaft 24.

The volumetric pump 216 is a geared volumetric pump located in the gearbox 30. The high pressure volumetric pump 216 will supply fluid to the variable geometries supply circuit 230 and the supply circuit 220 of the combustion chamber.

The volumetric pump 216 outputs a fuel flow that increases as a function of the rotation speed of the radial shaft 24, during normal operation of the turbomachine 1.

When a fire is detected in the turbomachine 1, the assembly composed of the kinetic pump 212 and the volumetric pump 216 is configured to stop delivering fuel towards the combustion chamber 16.

The variable geometries supply circuit 230 comprises variable geometries 232. These variable geometries 232 are equipment of the turbomachine 1 that require hydraulic power drawn off for their operation. The nature of the variable geometries 232 can vary, for example a ram, a servovalve, an adjustable compressor discharge valve, a transient compressor discharge valve, and/or an air flow control valve for a system to adjust the clearance at the top of the rotor blades for a low pressure turbine or a high pressure turbine.

The supply system 230 to variable geometries 232 is designed to route fuel from an inlet node C for separation of the variable geometries supply circuit 230 and the combustion chamber supply circuit 220, as far as an outlet node B located between the low pressure pump 212 and the high pressure volumetric pump 216. This variable geometries supply circuit 230 will supply a variable hydraulic power to the variable geometries 232.

The combustion chamber supply circuit 220 includes a fuel metering device 222 configured to regulate the fuel flow to the injection systems 224 of the combustion chamber 16. To achieve this, the fuel metering device 222 is designed to allow excess fuel to pass through a fluid recirculation loop 227 from a first node A located downstream from the inlet node C to the outlet node B.

There is a fluid connection between the cutoff device 130 and the fuel supply system 200 at a node I located upstream from the kinetic pump 212 and at a node j located downstream from the kinetic pump 212.

The cutoff device 130 comprises a main valve 300, a control valve 400 with a fluid connection to the main valve 300, a high pressure fuel supply line 500 with a fluid connection to node J, a low pressure supply line 530 with a fluid connection to node I, and a variable pressure supply line 560 that is alternatively connected to node I and to node J when the turbomachine 1 is in flight.

The cutoff device 130 opens/closes as a function of the pressure difference between node I and node I.

The cutoff device 130 is closed when the pressure difference between node J and node I is practically zero. The pressure difference between node J and node I is approximately zero when the kinetic pump 212 is stopped. The pressure difference between node J and node I is also approximately zero when a fire is detected in the turbomachine 1 and fuel is no longer supplied to the kinetic pump 212.

The cutoff device 130 is closed when the pressure difference between node J and node I is small enough, particularly when the rotation speed $V_R$ of the radial shaft 24 is less than a first threshold $S_1$. This first threshold $S_1$ corresponds to the minimum rotation speed $V_R$ above which the supply pump 112 delivers lubricant to the downstream part 210. Thus, risks of stagnation of lubricant outside the tank 101 are limited.

The cutoff device 130 is open when the pressure difference between node J and node I is high enough, particularly when the rotation speed $V_R$ of the radial shaft 24 is higher than a second threshold $S_2$ higher than the first threshold $S_1$. This second threshold $S_2$ is higher than the maximum self-rotation speed $V_{max}$ of the radial shaft 24, in other words the maximum rotation speed of the shaft 24 that is possible when there is no gas thrust in the turbine 10. The volumetric pump 216 is then running.

For information, the first threshold $S_1$ is equal to a value of the rotation speed $V_R$ of the radial shaft 24 that corresponds to about 4% of the maximum speed of the turbomachine 1. The second threshold $S_2$ may for example be equal to a value of the rotation speed $V_R$ of the radial shaft 24 that corresponds to about 7% of the maximum speed of the turbomachine 1.

The cutoff device 130 closes when the rotation speed $V_R$ of the shaft 24 reduces and becomes lower than the first threshold $S_1$. The cutoff device 130 opens when the rotation speed $V_R$ of the shaft 24 increases and becomes higher than the second threshold $S_2$. In other words, the threshold $S_2$ at which the cutoff device 130 opens is higher than the closing threshold $S_1$ of the cutoff device 130.

The cutoff device 130 operates with hysteresis, in other words operation depends on its previous state. Operation of the cutoff device 130 will be described later with reference to FIGS. 7 to 9.

Figure 3:
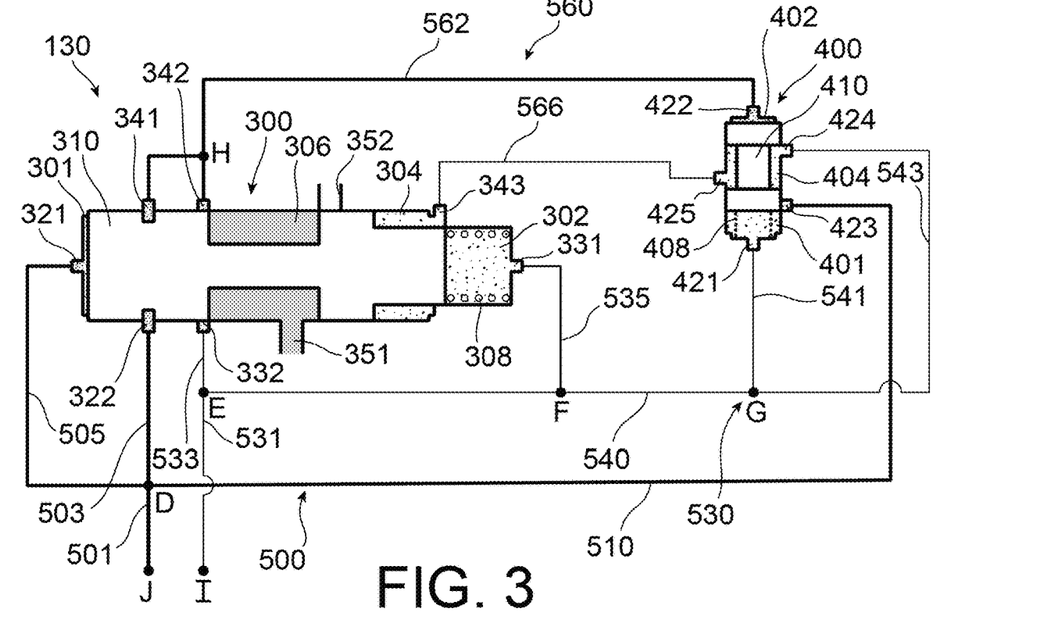
FIG. 3 is a partial diagrammatic view of the cutoff valve of the lubricant supply system, in a first closed position.

The main valve 300 comprises a high pressure chamber 301, a low pressure chamber 302, an intermediate chamber 306 located between the high pressure chamber 301 and the low pressure chamber 302, a main control chamber 304 and a first mobile closer 310.

The high pressure chamber 301 is connected to the high pressure line 500 through a high pressure inlet 321. It is continuously supplied with fuel at high pressure.

The low pressure chamber 302 is connected to the low pressure line 530 through a low pressure inlet 331. It is continuously supplied with fuel at low pressure.

The main control chamber 304 is located between the intermediate chamber 306 and the low pressure chamber 302. It is alternatively connected to the high pressure line 500 and to the low pressure line 530.

Figure 5:
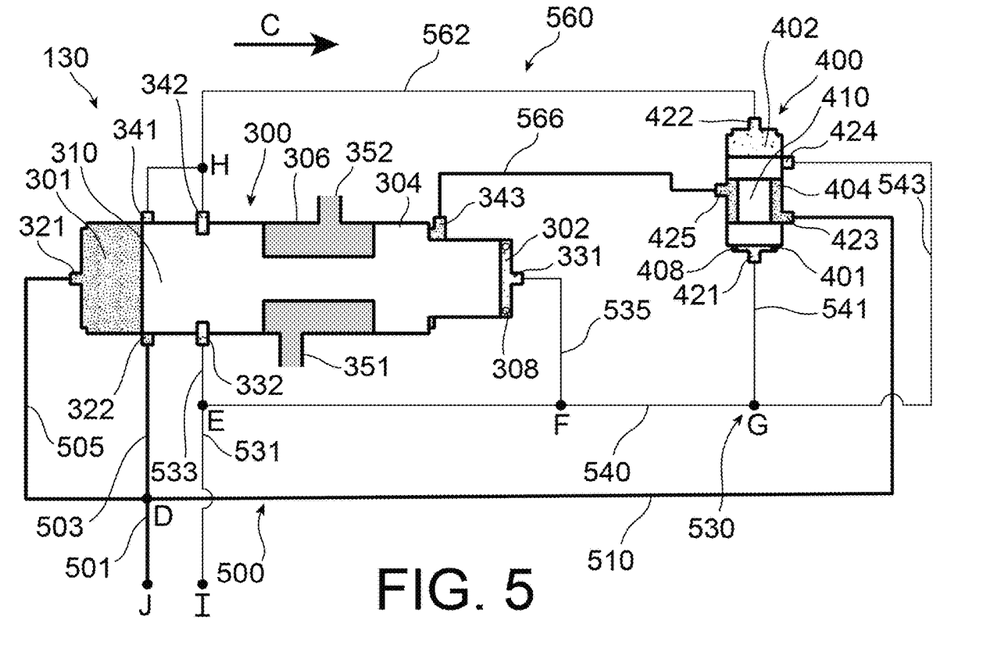
FIG. 5 is a partial diagrammatic view of the cutoff valve of the lubricant supply system, in a first open position.
Figure 6:
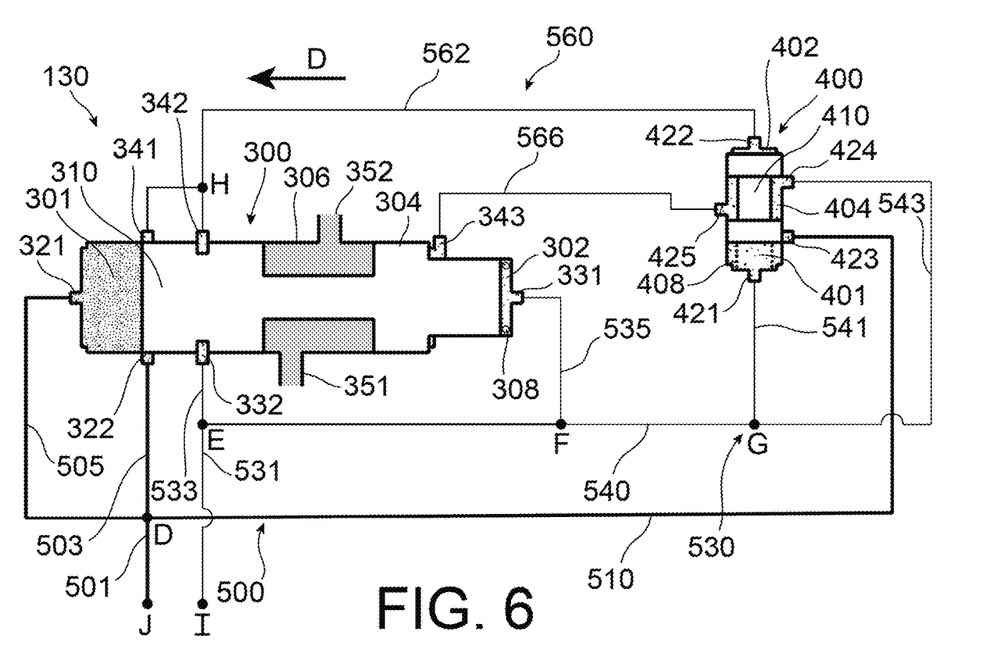
FIG. 6 is a partial diagrammatic view of the cutoff valve of the lubricant supply system, in a second open position.

In the operating states shown in FIGS. 3 and 6, the main control chamber 304 is connected to the low pressure line 530 through a third outlet port 343. In the operating states shown in FIGS. 4 and 5, the main control chamber 304 is connected to the high pressure line 500 through the third outlet port 343.

The intermediate chamber 306 is separated from the high pressure chamber 301, from the low pressure chamber 302 and from the main control chamber 304 by the closer 310. It is located around the closer 310. There is a fluid connection from it to the outlet conduit 103 from the tank 101 through a lubricant inlet 351. It is thus filled with lubricant. There is a fluid connection from it to a lubricant outlet 352 when the cutoff device 130 is open. There is no communication with the lubricant outlet 352 when the cutoff device 130 is closed.

The first closer 310 is located between the high pressure chamber 301 and the low pressure chamber 302 for which it varies the volume when it moves within the main valve 300. It is bistable, being free to move between a stable fully open position and a stable fully closed position. In the fully open position, the closer 310 leaves the intermediate chamber 306 in communication with the lubricant outlet 352. In the fully closed position, the closer 310 prevents lubricant from circulating through the lubricant outlet 352, being in front of this outlet 352.

Figure 4:
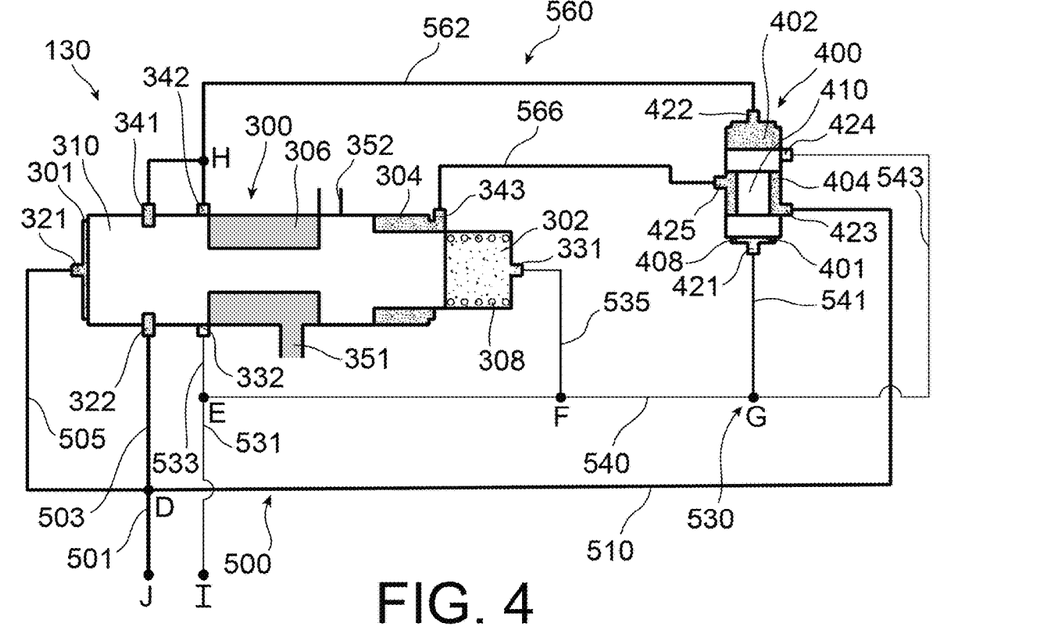
FIG. 4 is a partial diagrammatic view of the cutoff valve of the lubricant supply system, in a second closed position.

In the operating states shown in FIGS. 3 and 4, the closer 310 is in the fully closed position and the cutoff device 130 is closed-. In the operating states shown in FIGS. 5 and 6, the closer 310 is in the fully open position and the cutoff device 130 is open.

The closer 310 is pushed towards the high pressure chamber 301 by a first spring 308 located in the low pressure chamber 302. This spring 308 acts as a return means 308 configured to push the closer 310 towards its fully closed position.

The main valve 300 comprises the high pressure inlet 321, the low pressure inlet 331, a high pressure inlet port 322 with a fluid connection to the outlet J from the fuel pump and a low pressure inlet port 332 with a fluid connection to the inlet I of the fuel pump.

It also includes a first outlet port 341 and a second outlet port 342 each of which has a fluid connection alternatively to the high pressure inlet port 322 and to the low pressure inlet port 332.

In the operating states shown in FIGS. 3 and 4, the first outlet port 341 and a second outlet port 342 have a fluid connection to the high pressure line 500 through the high pressure inlet port 322 through an annular groove surrounding the first closer 310.

In the operating states shown in FIGS. 5 and 6, the first outlet port 341 and a second outlet port 342 have a fluid connection to the low pressure line 530 through the low pressure inlet port 332 through an annular groove surrounding the first closer 310.

The main valve 300 also includes the third outlet port 343, the lubricant inlet 351 and the lubricant outlet 352.

The control valve 400 comprises a first chamber 401 called the lower chamber, a second chamber 402 called the upper chamber, a secondary control chamber 404 that has a fluid connection to the main control chamber 304 through an outlet junction 425, and a second mobile closer 410.

The lower chamber 401 has a fluid connection to the low pressure line 530 through a lower junction 421. There is a fluid connection between the upper chamber 402 and the first outlet port 341 and the second outlet port 342, through an upper junction 422.

The control valve 400 also comprises a high pressure inlet 423 with a fluid connection to the high pressure line 500 and a low pressure inlet 424 with a fluid connection to the low pressure line 530. The secondary control chamber 404 has a fluid connection alternatively to the high pressure inlet 423 and to the low pressure inlet 424.

In the operating states shown in FIGS. 3 and 6, the secondary control chamber 404 is connected to the low pressure inlet 424. The main control chamber 304 is connected to the low pressure inlet 424 through the secondary control chamber 404.

In the operating states shown in FIGS. 4 and 5, the secondary control chamber 404 is connected to the high pressure inlet 423. The main control chamber 304 is connected to the high pressure inlet 423 through the secondary control chamber 404.

The second closer 410 is located between the lower chamber 401 and the upper chamber 402 for which it varies the volume when it moves within the control valve 400. It is bistable, being free to move between a stable fully open position and a stable fully closed position.

The closer 410 is pushed towards the upper chamber 402 by a second spring 408 located in the lower chamber 401. This spring 408 acts as a return means 408 configured to push the closer 410 towards its fully closed position.

In the fully closed position shown in FIGS. 3 and 6, the second closer 410 connects the secondary control chamber 404 to the low pressure inlet 424. The main control chamber 304 is then full of low pressure fuel and the first closer 310 is pushed at low force towards its closed position by the first return means 308 and by the fuel pressure in the main control chamber 304. The closing threshold of the cutoff device 130 is then fairly low.

In the fully open position shown in FIGS. 4 and 5, the second closer 410 connects the secondary control chamber 404 to the high pressure inlet 423. The main control chamber 304 is then full of high pressure fuel and the first closer 310 is pushed at high force towards its closed position by the first return means 308 and by the fuel pressure in the main control chamber 304. The opening threshold of the cutoff device 130 is then fairly high.

The high pressure line 500 comprises a main line 501 with a fluid connection to node J, a high pressure inlet port connection line 503, a high pressure chamber inlet connection line 505, and a high control pressure inlet line 510.

The high pressure inlet port connection line 503, the high pressure chamber inlet connection line 505, and the high control pressure inlet line 510 are each connected to the main line 501 at a high pressure inlet node D.

The high pressure inlet port connection line 503 extends from node D to the high pressure inlet port 322. The high pressure chamber inlet connection line 505 extends from node D to the high pressure inlet 321. The high control pressure inlet line 510 extends from node D to the high pressure inlet 423.

The low pressure line 530 comprises a main line 531 with a fluid connection to node I, a low pressure inlet port connection line 533, a low pressure chamber inlet connection line 535, and a low control pressure inlet line 540.

The low pressure inlet port connection line 533, the low pressure chamber inlet connection line 535, and the low control pressure inlet line 540 are each connected to the main line 531 at a first low pressure inlet node E.

The low pressure inlet port connection line 533 extends from node E to the low pressure inlet port 332. The low pressure chamber inlet connection line 535 extends from node E to the low pressure inlet 331. The low control pressure inlet line 540 that extends from node E to the low pressure inlet 424 and to the lower junction 421. The low control pressure inlet line 540 is subdivided at node G into a connection line 541 from the lower junction and a connection line 543 from the low pressure inlet 530.

The variable supply line 560 comprises an upper junction line 562 that makes a fluid connection from the upper junction 422 to the first outlet port 341 and to the second outlet port 342 that are separated from each other at a node H.

The variable supply line 560 comprises a connection line 566 that makes a fluid connection from the outlet junction 425 to the third outlet port 343.

Figure 7:
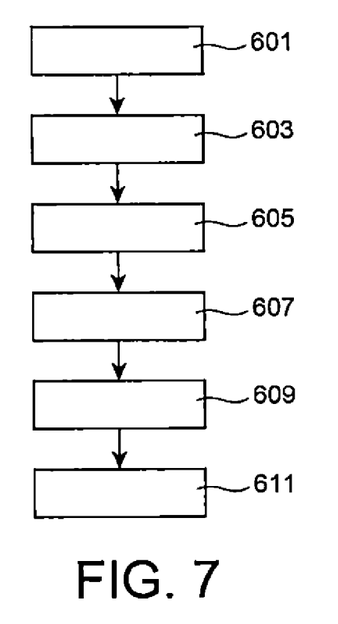
FIG. 7 illustrates an open/close sequence of the cutoff valve during normal operation of the turbomachine.

Operation of the cutoff device 130 during a flight when a fire is not detected in the turbomachine 1 is described with reference to FIG. 7. When the turbomachine 1 is running, the cutoff device 130 is closed to prevent lubricant from being emptied outside the tank 101 through the circuits of the turbomachine.

The cutoff device 130 is closed as long as the rotation speed $V_R$ of the radial shaft 24 is less than the first threshold $S_1$, in step 601. The distribution of fuel and lubricant in the cutoff device is similar to that shown on FIG. 3.

The cutoff device 130 remains closed in step 603, as long as the rotation speed $V_R$ of the radial shaft 24 remains less than the second threshold $S_2$. In general, the cutoff device 130 is closed when the rotation speed $V_R$ increases from a value lower than the first threshold $S_1$ to a value lower than the second threshold $S_2$.

The distribution of fuel and lubricant in the cutoff device is similar to that shown on FIG. 4. The lower junction line 566 is supplied with high pressure fuel to replace the low pressure fuel. The second closer 410 has moved towards its open position. The main control chamber 304 is filled with high pressure fuel to replace the low pressure fuel.

The cutoff device 130 opens in step 605 when the rotation speed $V_R$ of the radial shaft 24 goes beyond the second threshold $S_2$, particularly during a climb phase and a cruising phase of the turbomachine 1.

The distribution of fuel and lubricant in the cutoff device is similar to that shown on FIG. 5. The upper junction line 562 is supplied with low pressure fuel to replace the high pressure fuel. The first closer 310 has moved towards its open position along arrow C. The volume of the high pressure chamber 301 has increased, the volume of the main control chamber 304 has reduced, and the volume of the low pressure chamber 302 has reduced.

The cutoff device 130 remains open in step 607, as long as the rotation speed $V_R$ of the radial shaft 24 remains higher than the first threshold $S_1$. In general, the cutoff device 130 is open while the shaft rotation speed $V_R$ reduces from a value higher than the second threshold $S_2$ to a value of the rotation speed $V_R$ higher than the first threshold $S_1$, when there is no fire in the turbomachine 1.

The distribution of fuel and lubricant in the cutoff device is similar to that shown on FIG. 6. The lower junction line 566 is supplied with low pressure fuel to replace the high pressure fuel. The second closer 410 has moved towards its closed position.

At the end of the flight, the cutoff device 130 closes in step 609 when the rotation speed $V_R$ becomes lower than the first threshold $S_1$. It then remains closed in step 611.

The distribution of fuel and lubricant in the cutoff device is similar to that shown on FIG. 3. The upper junction line 562 is supplied with high pressure fuel to replace the low pressure fuel. The first closer 310 has moved towards its closed position along arrow D. The volume of the high pressure chamber 301 has reduced, the volume of the main control chamber 304 has increased, and the volume of the low pressure chamber 302 has increased.

Figure 9:
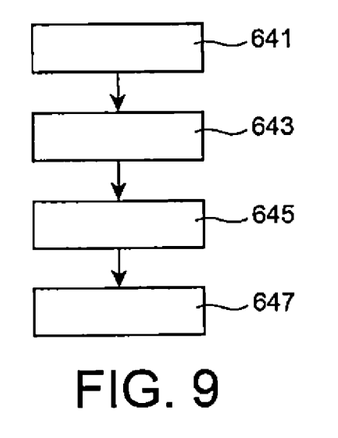
FIG. 9 illustrates an open/close sequence of the cutoff valve when the turbomachine is stopped in flight.

The specific operation of the cutoff device 130 during flight and when the engine is stopped during flight, regardless of whether or not the engine stop is controlled by the pilot, in the turbomachine 1 is described with reference to FIG. 9.

If the cutoff device 130 is open, it remains open in step 641, as long as the rotation speed $V_R$ remains higher than the first threshold $S_1$ and the combustion chamber 16 of the turbomachine 1 is in nominal operation.

When the engine is stopped in flight in step 643, which is the same as combustion being stopped in the combustion chamber 16, the rotation speed $V_R$, in other words the rotation speed of the turbomachine 1, slows progressively.

If the rotation speed $V_R$ remains higher than the first threshold $S_1$ and the rotation speed $V_R$ increases again after the engine is reignited in flight, the cutoff device 130 remains open.

If the rotation speed $V_R$ becomes lower than the first threshold $S_1$, the cutoff device 130 closes in step 645. It then remains closed as long as the rotation speed $V_R$ remains below the second threshold $S_2$. After an engine restart and when the rotation speed $V_R$ becomes higher than the second threshold $S_2$, the turbomachine 1 is once again supplied with lubricant in step 647.

Figure 8:
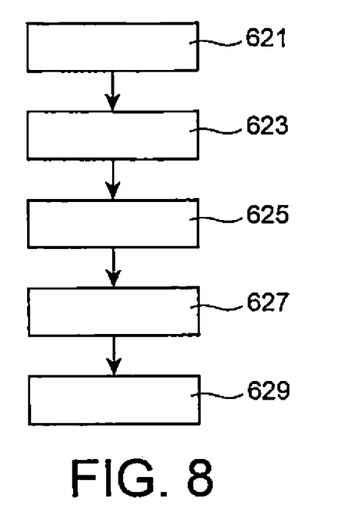
FIG. 8 illustrates an open/close sequence of the cutoff valve when a fire is detected in the turbomachine.

The specific operation of the cutoff device 130 during a flight when there is a fire in the turbomachine 1 is described with reference to FIG. 8. If the cutoff device 130 is open, it remains open in step 621, as long as the rotation speed $V_R$ remains higher than the first threshold $S_1$ and as long as the fire is not detected in the turbomachine 1, and the kinetic pump 212 and the volumetric pump 216 are in operation.

When the fire is detected in the turbomachine 1 in step 623, the turbomachine 1 can continue operating in flight idle speed for five minutes, and the fuel inlet to the turbomachine 1 will then be stopped which stops injection of fuel into the combustion chamber 16. The radial shaft 24 of the turbomachine 1 can continue to turn in self-rotation, which drives the fuel pumps 212 and 216 at a speed proportional to the rotation speed $V_R$ of the radial shaft 24. In self-rotation, the rotation speed $V_R$ will be between the thresholds $S_1$ and $S_2$. Fuel contained in the kinetic pump 212 is then emptied and it no longer generates a pressure rise in the fuel between the inlet I and the outlet J, despite its rotation.

The cutoff device 130 closes in step 625, even if the rotation speed $V_R$ remains higher than the first threshold $S_1$. It then remains closed as long as the fuel inlet to the turbomachine is not reopened and the rotation speed $V_R$ remains lower than the second threshold $S_2$. When the fire is extinguished, the kinetic pump 212 once again delivers fuel to the volumetric pump 216, in step 627.

The cutoff device 130 opens in step 629, when the rotation speed $V_R$ exceeds the second threshold $S_2$.

The cutoff device 130 makes it possible to respect regulations in force about protection of the turbomachine 1 against fire, while enabling satisfactory lubrication of equipment in the lubrication chambers 122, 124 during normal operation of the turbomachine 1.

The cutoff device 130 is hydromechanical, which makes it reliable. Furthermore, it does not need to be controlled electronically by the digital control system of the turbomachine, also known as "FADEC", particularly in case of fire.

The cutoff device 130 can replace existing temperature protections in the turbomachine 1, which reduces the mass and dimensions of the turbomachine 1.

Obviously, an expert in the subject can make various modifications to the invention as it has just been described, without going outside the framework of the invention.

In particular, the exchanger 155 may be located in the lubricant supply system, rather than in the lubricant return system 150.

The invention claimed is:

1. A lubrication system for a turbomachine, comprising:
    a lubricant tank,
    a downstream part comprising a lubricant pump to circulate lubricant, wherein the downstream part is located downstream from the lubricant tank, and
    a hydromechanical cutoff device located between the lubricant tank and the downstream part, wherein the hydromechanical cutoff device is configured to limit/prevent a lubricant flow towards the downstream part when the hydromechanical cutoff device is closed,
    wherein the hydromechanical cutoff device is configured to be closed when a rotation speed of a turbomachine shaft is lower than a first threshold, wherein the hydromechanical cutoff device is configured to be open when the turbomachine shaft rotation speed is higher than a second threshold which is higher than the first threshold,
    wherein the hydromechanical cutoff device is configured to close when the rotation speed of the turbomachine shaft reduces and becomes lower than the first threshold, and wherein the hydromechanical cutoff device is configured to open when the rotation speed of the turbomachine shaft increases and becomes higher than the second threshold,
    wherein the hydromechanical cutoff device includes a fluid connection to an inlet of a fuel pump and to an outlet of the fuel pump,
    wherein the fuel pump is configured to deliver fuel at increasing pressure depending on the turbomachine shaft rotation speed, when there is no fire in the turbomachine.

2. The lubrication system according to claim 1, in which the hydromechanical cutoff device is configured to be open while the turbomachine shaft rotation speed reduces from a value higher than the second threshold to a value of the rotation speed higher than the first threshold, when there is no fire in the turbomachine.

3. The lubrication system according to claim 1, in which the hydromechanical cutoff device is configured to be closed while the turbomachine shaft rotation speed increases from a value of the rotation speed lower than the first threshold to a value of the rotation speed lower than the second threshold.

4. The lubrication system according to claim 1, in which the lubricant pump is configured to operate when the turbomachine shaft rotation speed is higher than the first threshold.

5. The lubrication system according to claim 1, in which the second threshold is higher than a maximum self-rotation speed of the turbomachine shaft of the turbomachine.

6. The lubrication system according to claim 1, in which the fuel pump is configured to stop when a fire is detected in the turbomachine, wherein the hydromechanical cutoff device is configured to close when the fuel pump is stopped.

7. The lubrication system according to claim 1, wherein the fuel pump comprises a kinetic pump.

8. The lubrication system according to claim 7, wherein the fuel pump comprises a centrifugal pump.

9. The lubrication system according to claim 1, in which the fuel pump is a low pressure fuel pump for a turbomachine fuel supply system, wherein the fuel pump is configured to deliver fuel to a high pressure pump.

10. The lubrication system according to claim 9, wherein the high pressure pump is a volumetric pump.

11. The lubrication system according to claim 1, in which the hydromechanical cutoff device comprises a main valve comprising:
    at least one first chamber with a fluid connection to the fuel pump, and
    a main control chamber separated from the at least one first chamber by a main valve closer, wherein the main control chamber is configured to be connected alternatively to the inlet of the fuel pump and to the outlet of the fuel pump.

12. The lubrication system according to claim 11, in which the main valve comprises:
    a high pressure inlet with a fluid connection to the fuel pump outlet, the high pressure inlet opening up into a high pressure chamber of the main valve,
    a low pressure inlet with a fluid connection to the fuel pump inlet, the low pressure inlet opening up into a low pressure chamber of the main valve separated from the high pressure chamber by the main valve closer,
    a high pressure inlet port with a fluid connection to the fuel pump outlet,
    a low pressure inlet port with a fluid connection to the fuel pump inlet,
    a first outlet port with a fluid connection alternatively to the high pressure inlet port and to the low pressure inlet port,
    another outlet port with a fluid connection to the main control chamber, and a lubricant inlet and a lubricant outlet.

13. The lubrication system according to claim 11, in which the hydromechanical cutoff device comprises a control valve comprising at least one secondary control chamber with a fluid connection to the main control chamber and alternatively connected to the fuel pump inlet and to the fuel pump outlet.

14. The lubrication system according to claim 13, in which the control valve also comprises:
    a first control valve chamber with a fluid connection to the fuel pump inlet, and
    a second control valve chamber with a fluid connection to a first outlet port of the main valve, and separated from the first control valve chamber by a control valve closer.

15. A turbomachine comprising a lubrication system according to claim 1.

16. A method of operating the turbomachine according to claim 15,
    wherein the hydromechanical cutoff device is closed when the rotation speed of the turbomachine shaft is lower than the first threshold, wherein the hydromechanical cutoff device is opened when the turbomachine shaft rotation speed is higher than the second threshold,
    wherein the hydromechanical cutoff device closes when the rotation speed of the turbomachine shaft reduces and becomes lower than the first threshold, and
    wherein the hydromechanical cutoff device opens when the rotation speed of the turbomachine shaft increases and becomes higher than the second threshold.

* * * * *